(12) United States Patent
Jang et al.

(10) Patent No.: US 11,708,443 B2
(45) Date of Patent: Jul. 25, 2023

(54) METHOD OF PREPARING GRAFT COPOLYMER

(71) Applicant: LG CHEM, LTD., Seoul (KR)

(72) Inventors: Ji Uk Jang, Daejeon (KR); Dae Woo Lee, Daejeon (KR); Jae Bum Seo, Daejeon (KR); Jung Tae Park, Daejeon (KR); Gyu Sun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 407 days.

(21) Appl. No.: 17/047,657

(22) PCT Filed: Nov. 8, 2019

(86) PCT No.: PCT/KR2019/015137
§ 371 (c)(1),
(2) Date: Oct. 14, 2020

(87) PCT Pub. No.: WO2020/101275
PCT Pub. Date: May 22, 2020

(65) Prior Publication Data

US 2021/0163652 A1    Jun. 3, 2021

(30) Foreign Application Priority Data

Nov. 15, 2018    (KR) .................. 10-2018-0141065

(51) Int. Cl.
| | | |
|---|---|---|
| *C08F 279/04* | (2006.01) | |
| *C08F 2/02* | (2006.01) | |
| *C08F 226/06* | (2006.01) | |
| *C08L 55/02* | (2006.01) | |

(52) U.S. Cl.
CPC .............. *C08F 279/04* (2013.01); *C08F 2/02* (2013.01); *C08F 226/06* (2013.01); *C08L 55/02* (2013.01); *C08L 2201/08* (2013.01)

(58) Field of Classification Search
CPC ...... C08L 51/04; C08F 279/02; C08F 222/40; C08F 279/00; C08F 279/04
See application file for complete search history.

(56) References Cited

U.S. PATENT DOCUMENTS

| | | | | |
|---|---|---|---|---|
| 4,808,661 A | * | 2/1989 | Iwamoto | ................. C08L 35/06 525/73 |
| 4,879,343 A | | 11/1989 | Aoki et al. | |
| 5,149,827 A | | 9/1992 | Kita et al. | |
| 5,412,036 A | * | 5/1995 | Traugott | ............... C08F 279/02 525/282 |
| 5,446,103 A | | 8/1995 | Traugott et al. | |
| 5,635,565 A | | 6/1997 | Miyajima et al. | |
| 5,993,687 A | * | 11/1999 | Kishino | ................ C07C 253/32 252/182.14 |
| 2017/0275452 A1 | | 9/2017 | Seo et al. | |
| 2018/0355085 A1 | | 12/2018 | Seo et al. | |

FOREIGN PATENT DOCUMENTS

| | | |
|---|---|---|
| CN | 107075045 A | 8/2017 |
| CN | 108290984 A | 7/2018 |
| JP | S63-146955 A | 6/1988 |
| JP | H03209363 A | 9/1991 |
| JP | H0426673 A | 1/1992 |
| JP | H09-503535 A | 4/1997 |
| JP | H09323972 A | 12/1997 |
| JP | WO2016-186133 A | 11/2016 |
| KR | 10-1995-0002153 B1 | 3/1995 |
| KR | 10-0392314 B1 | 3/2004 |
| KR | 10-2008-0060750 A | 7/2008 |
| KR | 20090072946 A * | 7/2009 |
| KR | 100963086 B1 | 6/2010 |
| KR | 10-2011-0063947 A | 6/2011 |
| KR | 10-1294910 B1 | 8/2013 |
| KR | 10-2016-0150052 A | 12/2016 |
| TW | 429264 B | 4/2001 |

OTHER PUBLICATIONS

Extended European Search Report for EP 19884934.1, dated May 14, 2021.

* cited by examiner

*Primary Examiner* — Mark S Kaucher

(57) ABSTRACT

Provided is a method of preparing a graft copolymer, which includes: preparing a liquid maleimide-based monomer; preparing a reaction solution including a diene-based rubber polymer, an aromatic vinyl-based monomer, and a vinyl cyan-based monomer; and adding the liquid maleimide-based monomer and the reaction solution to a reactor and carrying out polymerization. According to the preparation method of the present invention, the amount of the maleimide-based monomer involved in the polymerization can be increased, and the color characteristics, glass transition temperature, and softening temperature of the graft copolymer are improved.

9 Claims, No Drawings

METHOD OF PREPARING GRAFT COPOLYMER

CROSS-REFERENCE TO RELATED APPLICATION

The present application is a National Phase entry of International Application No. PCT/KR2019/015137, which claims priority to and the benefit of Korean Patent Application No. 10-2018-0141065, filed on Nov. 15, 2018, the disclosures of which are incorporated herein by reference in their entirety.

TECHNICAL FIELD

The present invention relates to a method of preparing a graft copolymer, specifically, to a method of preparing a graft copolymer having an improved polymerization conversion rate of a maleimide-based monomer.

BACKGROUND ART

Conventionally, a thermoplastic resin composition including an ABS graft copolymer prepared by emulsion polymerization and an α-methylstyrene/acrylonitrile copolymer or a thermoplastic resin composition including an ABS graft copolymer prepared by emulsion polymerization and an n-phenylmaleimide/styrene/acrylonitrile copolymer has been used as a heat-resistant resin composition.

However, although the heat-resistant resin composition exhibits excellent impact strength or excellent heat resistance, the ABS graft copolymer prepared by emulsion polymerization leaves a large amount of residues such that a large amount of gas is generated during injection molding, which leads to degradation of thermal stability and surface characteristics.

In order to solve this problem, a heat-resistant ABS graft copolymer which exhibits improved heat resistance by adding a maleimide-based monomer in the preparation of an ABS graft copolymer and has an improved polymerization conversion rate by carrying out continuous bulk polymerization was developed.

However, although the heat-resistant ABS graft copolymer is excellent in heat resistance and processability due to a remarkably reduced amount of residues, it has a limitation in being applied as automotive interior materials due to its unique odor. In addition, the maleimide-based monomer is not sufficiently dissolved in a reaction solution such that a polymerization conversion rate is low, and has a yellow color due to intrinsic characteristics, which leads to degradation of the color characteristics of the heat-resistant ABS graft copolymer.

DISCLOSURE

Technical Problem

The present invention provides a method of preparing a graft copolymer which is capable of increasing a polymerization conversion rate of a maleimide-based monomer and improving the color characteristics of a graft copolymer.

In addition, the present invention provides a method of preparing a graft copolymer which is capable of remarkably reducing residual monomers and total volatile organic compounds in a graft copolymer.

Technical Solution

One aspect of the present invention provides a method of preparing a graft copolymer, which includes: preparing a liquid maleimide-based monomer; preparing a reaction solution including a diene-based rubber polymer, an aromatic vinyl-based monomer, and a vinyl cyan-based monomer; and adding the liquid maleimide-based monomer and the reaction solution to a reactor and carrying out polymerization.

Advantageous Effects

According to a method of preparing a graft copolymer of the present invention, a polymerization conversion rate of a maleimide-based monomer can be increased, and the color characteristics of a graft copolymer can be improved. In addition, residual monomers and total volatile organic compounds in a graft copolymer can be remarkably reduced.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

A method of preparing a graft copolymer according to an embodiment of the present invention includes: 1) preparing a liquid maleimide-based monomer; 2) preparing a reaction solution including a diene-based rubber polymer, an aromatic vinyl-based monomer, and a vinyl cyan-based monomer; and 3) adding the liquid maleimide-based monomer and the reaction solution to a reactor and carrying out polymerization.

The method of preparing a graft copolymer according to an embodiment of the present invention further include, after the polymerization, 4) removing unreacted monomers and a solvent from a product of the polymerization.

Hereinafter, each step of the method of preparing a graft copolymer according to an embodiment of the present invention will be described in detail.

Step 1): Preparation of Liquid Maleimide-Based Monomer

First, a liquid maleimide-based monomer is prepared.

Conventionally, a maleimide-based monomer dissolved in a vinyl cyan-based monomer is added to a reaction solution including a diene-based rubber polymer, an aromatic vinyl-based monomer, and a reaction solvent, and polymerization is then carried out.

However, all of the added maleimide-based monomer could not be sufficiently dissolved due to not only an insufficient amount of the vinyl cyan-based monomer but also poor solubility in the reaction solution. This causes a lot of precipitation during the transfer of the reaction solution, to which the maleimide-based monomer has been added, to a reactor. In addition, due to the precipitation, the amount of the maleimide-based monomer involved in a reaction is relatively decreased compared to the addition amount thereof, such that it is difficult to prepare a graft copolymer with a desired composition. Additionally, a separate process for removing the precipitated maleimide-based monomer is required such that process efficiency is degraded.

On the other hand, in the present invention, by preparing a liquid maleimide-based monomer, the precipitation problem occurring during the transfer to a reactor can be solved, a separate removal process is not required, and the amount of a maleimide-based monomer that can be involved in polymerization is increased, such that not only manufacturing costs can be reduced but also production efficiency can be increased.

The liquid maleimide-based monomer may be prepared by melting a solid-phase maleimide-based monomer.

By using the above-described method, it is possible to remarkably increase the amount of the maleimide-based monomer involved in polymerization through a simple method and to minimize a process of dissolving a maleimide-based monomer in a vinyl cyan-based monomer to allow the maleimide-based monomer to be involved in polymerization and a process of removing precipitated maleimide-based monomers.

The melting may be carried out at a temperature equal to or higher than the melting point of the maleimide-based monomer, preferably a temperature 5 to 40° C. higher than the melting point, and more preferably a temperature 10 to 25° C. higher than the melting point. When the above-described temperature is satisfied, a solid-phase maleimide-based monomer can be easily melted to prepare a liquid maleimide-based monomer, and the expression of yellow color caused by a maleimide-based monomer can also be minimized. However, when the melting is carried out at a temperature much higher than the above-described temperature, energy efficiency is degraded, and a browning phenomenon may occur due to impurities included in the maleimide-based monomer, or a small amount of the maleimide-based monomer may be decomposed, thereby the color characteristics of an injection-molded specimen made of a graft copolymer may be degraded.

Meanwhile, it is preferable to maintain the liquid maleimide-based monomer at the above-described melting temperature so that the liquid phase thereof is maintained until the liquid maleimide-based monomer is added to a reactor, that is, is involved in the polymerization.

The maleimide-based monomer may be one or more selected from the group consisting of maleimide, N-methylmaleimide, N-cyclohexylmaleimide, N-phenylmaleimide, N-(4-chlorophenyl)maleimide, 2-methyl-N-phenylmaleimide, and N-(p-methoxyphenyl)maleimide, with N-phenylmaleimide being preferred.

The maleimide-based monomer may be added in an amount of 1 to 10 parts by weight or 2 to 7 parts by weight with respect to 100 parts by weight of the sum of the diene-based rubber polymer and monomers which are added in the method of preparing a graft copolymer, with the range of 2 to 7 parts by weight being preferred. When the above-described condition is satisfied, the heat resistance of the graft copolymer can be enhanced, and degradation of color characteristics of the graft copolymer which is caused by the maleimide-based monomer can also be minimized. In addition, the reaction solution including the maleimide-based monomer can be more easily polymerized while maintaining an appropriate viscosity during the polymerization.

Step 2) Preparation of Reaction Solution

Next, a reaction solution including a diene-based rubber polymer, an aromatic vinyl-based monomer, and a vinyl cyan-based monomer is prepared.

The diene-based rubber polymer may be a cross-linked polymer formed of a conjugated diene-based monomer and may be a cross-linked copolymer of a monomer mixture including a conjugated diene-based monomer and one or more selected from the group consisting of an aromatic vinyl-based monomer and a vinyl cyan-based monomer.

The conjugated diene-based monomer may be one or more selected from the group consisting of 1,3-butadiene, isoprene, chloroprene, and piperylene, with 1,3-butadiene being preferred.

The aromatic vinyl-based monomer may be one or more selected from the group consisting of styrene, α-methylstyrene, p-methylstyrene, 2,4-dimethylstyrene, p-bromostyrene, o-bromostyrene, and p-chlorostyrene, with styrene being preferred.

The vinyl cyan-based monomer may be one or more selected from the group consisting of acrylonitrile, methacrylonitrile, and ethacrylonitrile, with acrylonitrile being preferred.

The diene-based rubber polymer preferably includes one or more selected from the group consisting of a butadiene rubber polymer and a styrene-butadiene rubber copolymer, and preferably includes both of them. When the diene-based rubber polymer includes both a butadiene rubber polymer and a styrene-butadiene rubber copolymer, it may have a viscosity of 50 cP or less or 10 to 50 cP. Meanwhile, the diene-based rubber polymer may include a butadiene rubber polymer and a styrene-butadiene rubber copolymer in a weight ratio of 3:7 to 5:5 or 3:7 to 4:6, with the range of 3:7 to 4:5 being preferred. When the above-described condition is satisfied, a diene-based rubber polymer having the above-described viscosity can be prepared. When the content of a butadiene rubber polymer does not satisfy the above-described range, it is difficult to adjust an average particle diameter of the diene-based rubber polymer in the graft copolymer such that low gloss characteristics may not be easily realized, and impact resistance may be degraded.

The viscosity may be measured using a Brookfield DV viscometer (#3 spindle, 10 rpm) after the diene-based rubber polymer is dissolved in styrene at a concentration of 5 wt %.

The average particle diameter of the diene-based rubber polymer may be 0.5 to 3 μm, 1 to 2.5 μm, or 1.5 to 2 μm, with the range of 1.5 to 2 μm being preferred. When the above-described range is satisfied, not only the impact resistance of the graft copolymer can be improved but also low gloss characteristics can be realized. Below the above-described range, low gloss characteristics may not be realized, and above the above-described range, surface characteristics may be degraded.

The diene-based rubber polymer may be directly prepared, or a commercially available product may be purchased and used as the diene-based rubber polymer.

Meanwhile, the diene-based rubber polymer may be added in an amount of 5 to 25 parts by weight or 8 to 20 parts by weight with respect to 100 parts by weight of the sum of the diene-based rubber polymer and monomers which are added in the method of preparing a graft copolymer, with the range of 8 to 20 parts by weight being preferred. When the above-describe range is satisfied, the diene-based rubber polymer can be easily dissolved in the reaction solution such that its involvement in polymerization is facilitated, and the impact resistance of the graft copolymer can be improved.

The aromatic vinyl-based monomer may be added in an amount of 55 to 75 parts by weight or 60 to 70 parts by weight with respect to 100 parts by weight of the sum of the diene-based rubber polymer and monomers which are added in the method of preparing a graft copolymer, with the range of 60 to 70 parts by weight being preferred. When the above-described condition is satisfied, the processability of the graft copolymer can be improved.

The vinyl cyan-based monomer may be added in an amount of 5 to 25 parts by weight or 10 to 20 parts by weight with respect to 100 parts by weight of the sum of the diene-based rubber polymer and monomers which are added in the method of preparing a graft copolymer, with the range of 10 to 20 parts by weight being preferred. When the above-described condition is satisfied, the chemical resistance of the graft copolymer can be improved.

The reaction solution may further include a reaction solvent to allow the diene-based rubber polymer to be sufficiently dissolved and to maintain the viscosity for facilitating involvement in polymerization.

The reaction solvent may be one or more selected from the group consisting of toluene, ethylbenzene, xylene, and methyl ethyl ketone, with ethylbenzene being preferred.

Subsequently, the method of preparing a graft copolymer according to the present invention may further include, before polymerization is carried out, mixing the liquid maleimide-based monomer and the reaction solution and then stirring them to facilitate polymerization.

Step 3) Polymerization

Next, the liquid maleimide-based monomer and the reaction solution are added to a reactor and polymerization is carried out.

The polymerization may be bulk polymerization, specifically, continuous bulk polymerization. The polymerization may include primarily polymerizing the reaction solution having been added to a reactor at a third temperature and secondarily polymerizing a product of the primary polymerization at a fourth temperature higher than the third temperature.

The primary polymerization may be a process in which the liquid maleimide-based monomer, the diene-based rubber polymer, the aromatic vinyl-based monomer, and the vinyl cyan-based monomer are subjected to phase transformation to form a graft copolymer, and the secondary polymerization may be carried out to increase a polymerization conversion rate.

The third temperature may be 90 to 120° C. or 100 to 110° C., with the range of 100 to 110° C. being preferred. When the above-described temperature is satisfied, not only a phase transformation rate is improved but also graft polymerization is facilitated, thereby a graft copolymer having an appropriate average particle diameter and an appropriate degree of grafting can be prepared. In addition, a graft copolymer having low gloss characteristics and excellent surface characteristics can be prepared.

In the primary bulk polymerization, an initiator and a molecular weight controlling agent may be further added.

The initiator may be a radical polymerization initiator whose 1-hour half-life temperature is 90 to 110° C. The initiator may be one or more selected from the group consisting of stearoyl peroxide, benzoyl peroxide, t-butyl peroxy-2-ethylhexanoate, t-butyl peroxy-isobutyrate, and 1,1-di(t-butyl peroxy)-3,5,5-trimethylcyclohexane, with t-butyl peroxy-2-ethylhexanoate being preferred.

The initiator may be added in an amount of 0.001 to 0.1 part by weight or 0.01 to 0.05 part by weight with respect to 100 parts by weight of the sum of the diene-based rubber polymer and monomers which are added in the method of preparing a graft copolymer, with the range of 0.01 to 0.05 part by weight being preferred. When the above-described range is satisfied, polymerization can be easily initiated and carried out.

The molecular weight controlling agent may be one or more selected from the group consisting of t-dodecyl mercaptan and n-octyl mercaptan, with t-dodecyl mercaptan being preferred.

The molecular weight controlling agent may be added in an amount of 0.001 to 0.1 part by weight or 0.005 to 0.05 part by weight with respect to 100 parts by weight of the sum of the diene-based rubber polymer and monomers which are added in the method of preparing a graft copolymer, with the range of 0.005 to 0.05 part by weight being preferred. When the above-described range is satisfied, not only graft polymerization can be easily carried out but also a shell having an appropriate weight-average molecular weight can be prepared.

The primary polymerization may be carried out while continuously adding the liquid maleimide-based monomer, the reaction solution, the initiator, and the molecular weight controlling agent at a constant rate to improve polymerization stability.

Subsequently, a product of the primary polymerization may be secondarily polymerized at a fourth temperature.

The fourth temperature may be 120 to 140° C. or 125 to 135° C., with the range of 125 to 135° C. being preferred. When the above-described condition is satisfied, the polymerization conversion rate of the graft copolymer can be improved.

In addition, in order to further increase the polymerization conversion rate of the graft copolymer, after the secondary polymerization is completed, tertiary polymerization at a fifth temperature higher than the fourth temperature and quaternary polymerization at a sixth temperature higher than the fifth temperature may be further carried out.

The fifth temperature may be 135 to 155° C. or 140 to 150° C., with the range of 140 to 150° C. being preferred. The sixth temperature may be 140 to 160° C. or 145 to 155° C., with the range of 145 to 155° C. being preferred. When the above-described temperatures are satisfied, the viscosity of a polymerization product is appropriately maintained such that polymerization can be easily carried out.

Step 4): Removal of Unreacted Monomers and Solvent

Next, unreacted monomers and a solvent may be removed from the copolymer.

The removal of unreacted monomers and a solvent may include: primarily removing unreacted monomers and a solvent from a copolymer at a first temperature and a first pressure; and secondarily removing unreacted monomers and a solvent from the copolymer, from which unreacted monomers and a solvent have been primarily removed, at a second temperature and a second pressure.

When the removal is carried out in two steps, the amount of residual monomers and total volatile organic compounds in the graft copolymer can be minimized, such that a graft copolymer having improved odor characteristics can be prepared. In addition, unreacted monomers which are residual monomers can be recovered and reused such that manufacturing costs can be reduced.

Here, it is preferable that the first temperature is lower than the second temperature and the first pressure is higher than the second pressure. When the above-described conditions are satisfied, the copolymer that has undergone the primary removal may have a viscosity suitable for easy transfer to a volatilization tank where the secondary removal takes place.

The first temperature may be 140 to 180° C. or 150 to 170° C., with the range of 150 to 170° C. being preferred. In addition, the first pressure may be 400 to 600 Torr or 450 to 550 Torr, with the range of 450 to 550 Torr being preferred. When the above-described conditions are satisfied, unreacted monomers are easily removed without excessively consuming energy, and an appropriate amount of residues such as a solvent and the like can remain in the copolymer that has undergone the primary removal. Accordingly, the viscosity of the copolymer that has undergone the primary removal is suitably maintained for easy transfer to a second volatilization tank where the secondary removal takes place.

The second temperature may be 210 to 250° C. or 220 to 240° C., with the range of 220 to 240° C. being preferred. In addition, the second pressure may be 20 Torr or less or 5 to 15 Torr, with the range of 5 to 15 Torr being preferred. When the above-described conditions are satisfied, unreacted monomers and a solvent can be removed as much as possible from the polymer that has undergone the primary removal.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Preparation Example 1

Solid-phase N-phenylmaleimide was melted at 110° C. to prepare liquid N-phenylmaleimide.

Preparation Example 2

Solid-phase N-phenylmaleimide was melted at 130° C. to prepare liquid N-phenylmaleimide.

Examples and Comparative Examples

The details of the components used in Examples and Comparative Examples are as follows.
(A) Maleimide-based monomer
(A-1) The liquid N-phenylmaleimide prepared in Preparation Example 1 was used.
(A-2) The liquid N-phenylmaleimide prepared in Preparation Example 2 was used.
(A-3) Solid-phase N-phenylmaleimide was used.
(B) Diene-based rubber polymer
(B-1) Butadiene rubber polymer: A butadiene rubber polymer prepared by crosslinking polymerization of 1,3-butadiene alone was used.
(B-2) Butadiene-styrene rubber polymer: A butadiene-styrene rubber polymer prepared by crosslinking polymerization of a monomer mixture including 1,3-butadiene at 60 wt % and styrene at 40 wt % was used.

Example 1

49.8 parts by weight of styrene, 12.5 parts by weight of acrylonitrile, 3.4 parts by weight of Component (B-1), 6.4 parts by weight of Component (B-2), 0.13 part by weight of SONGNOX-1076 (manufactured by Songwon Industrial Co., Ltd.) as an antioxidant, and 0.01 part by weight of t-dodecyl mercaptan as a molecular weight controlling agent were added to and dissolved in 25 parts by weight of ethylbenzene to prepare a reaction solution.

The reaction solution, 2.7 parts by weight of Component (A-1), and 0.02 part by weight of t-butyl peroxy-2-ethylhexanoate as an initiator were mixed and stirred, and then primary bulk polymerization was carried out for 2 hours while continuously adding the resulting mixture to a first reactor set at 105° C. at a constant rate. Secondary bulk polymerization was carried out for 2 hours while continuously adding a product of the primary polymerization and 0.004 part by weight of t-dodecyl mercaptan as a molecular weight controlling agent to a second reactor set at 130° C. at a constant rate. Tertiary bulk polymerization was carried out for 1.2 hours while continuously adding a product of the secondary polymerization to a third reactor set at 145° C. at a constant rate. Quaternary bulk polymerization was carried out for 1.2 hours while continuously adding a product of the tertiary polymerization to a fourth reactor set at 150° C.

The product of the quaternary polymerization was added to a first volatilization tank to primarily remove unreacted monomers and a solvent at 160° C. and 500 Torr, and then the product that had undergone the primary removal was added to a second volatilization tank to secondarily remove unreacted monomers and a solvent at 230° C. and 10 Torr, thereby a graft copolymer in a pellet form was prepared.

Example 2

A graft copolymer was prepared in the same manner as in Example 1 except that Component (A-2) was used instead of Component (A-1).

Example 3

A graft copolymer was prepared in the same manner as in Example 1 except that 3.2 parts by weight of Component (A-1) was used.

Example 4

A graft copolymer was prepared in the same manner as in Example 1 except that 3 parts by weight of Component (A-1) was used.

Example 5

A graft copolymer was prepared in the same manner as in Example 1 except that the product of the quaternary polymerization was added to a first volatilization tank to remove unreacted monomers and a solvent at 235° C. and 10 Torr, thereby a graft copolymer in a pellet form was prepared.

Comparative Example 1

A graft copolymer was prepared in the same manner as in Example 1 except that 3.3 parts by weight of Component (A-3) was used instead of Component (A-1).

Comparative Example 2

A graft copolymer was prepared in the same manner as in Example 1 except that Component (A-1) was not used.

Comparative Example 3

3.3 parts by weight of Component (A-3) was dissolved in 12.5 parts by weight of acrylonitrile to prepare a first reaction solution.

49.8 parts by weight of styrene, 3.4 parts by weight of Component (B-1), 6.4 parts by weight of Component (B-2), 0.13 part by weight of SONGNOX-1076 (manufactured by Songwon Industrial Co., Ltd.) as an antioxidant, and 0.01 part by weight of t-dodecyl mercaptan as a molecular weight controlling agent were added to and dissolved in 25 parts by weight of ethylbenzene to prepare a second reaction solution.

The first reaction solution, the second reaction solution, and 0.02 part by weight of t-butyl peroxy-2-ethylhexanoate as an initiator were mixed and stirred, and then primary bulk polymerization was carried out for 2 hours while continuously adding the resulting mixture to a first reactor set at 105° C. at a constant rate. Secondary bulk polymerization was carried out for 2 hours while continuously adding a product of the primary polymerization and 0.004 part by weight of t-dodecyl mercaptan as a molecular weight controlling agent to a second reactor set at 130° C. at a constant rate. Tertiary bulk polymerization was carried out for 1.2 hours while continuously adding a product of the secondary polymerization to a third reactor set at 145° C. at a constant rate. Quaternary bulk polymerization was carried out for 1.2 hours while continuously adding a product of the tertiary polymerization to a fourth reactor set at 150° C.

The product of the quaternary polymerization was added to a first volatilization tank to remove unreacted monomers and a solvent at 235° C. and 10 Torr, thereby a graft copolymer in a pellet form was prepared.

Comparative Example 4

A graft copolymer was prepared in the same manner as in Comparative Example 3 except that Component (A-3) was not used.

Meanwhile, the main components and process conditions of Examples and Comparative Examples are summarized and shown in Table 1 below.

Experimental Example 1

The material properties of the graft copolymers prepared in Examples and Comparative Examples were measured by the methods described below, and the results are shown in Table 1 and Table 2 below.

1) Content (wt %) of maleimide-based monomer unit in graft copolymer: measured using the AVATAR 360 Fourier Transform Infrared (FTIR) manufactured by Thermo Nicolet and the GladiATR™ accessory manufactured by PIKE Technologies, Inc.

2) Glass transition temperature (Tg, ° C.): measured using the Q20 DSC manufactured by TA Instruments.

3) Softening Temperature (° C.): measured in accordance with ASTM D1525.

4) Residual monomer: The graft copolymer was dissolved in a chloroform solution and precipitated in methanol, and then a supernatant was analyzed using gel chromatography.

5) Total volatile organic compound (TVOC, μgC/g): measured by a Head-Space method in accordance with PV3341 (conditions: 5 hours, 120° C., 1 g, 10 ml).

Experimental Example 2

The graft copolymers of Examples and Comparative Examples were injection-molded to prepare specimens. The specimens were measured for a material property by the method described below, and the results are shown in Table 1 and Table 2 below.

6) b: A "b" value was measured in the CIE LAB color coordinate system using SM-T45 S&M COLOUR METER manufactured by Suga Test Instruments Co., Ltd.

TABLE 1

| Classification | | | Examples | | | | |
|---|---|---|---|---|---|---|---|
| | | | 1 | 2 | 3 | 4 | 5 |
| (A) Maleimide- | (A-1) | | 2.7 | — | 3.2 | 3.0 | 2.7 |
| based monomer | (A-2) | | — | 2.7 | — | — | — |
| (parts by weight) | (A-3) | | — | — | — | — | — |
| First volatilization tank | | | o | o | o | o | o |
| Second volatilization tank | | | o | o | o | o | o |
| Content of maleimide-based monomer unit in graft copolymer | | | 4.9 | 4.8 | 5.4 | 5.2 | 4.8 |
| Glass transition temperature | | | 115.8 | 115.3 | 116.4 | 116.0 | 115.3 |
| VST | | | 107.2 | 106.7 | 107.8 | 107.4 | 106.8 |
| Residual monomer | | | 378 | 388 | 436 | 427 | 762 |
| TVOC | | | 28.14 | 33.4 | 34.9 | 33.69 | 55.47 |
| b | | | 0.2 | 2.8 | 4.2 | 3.2 | −0.1 |

TABLE 2

| Classification | | | Comparative Examples | | | |
|---|---|---|---|---|---|---|
| | | | 1 | 2 | 3 | 4 |
| (A) Maleimide- | (A-1) | | — | — | — | — |
| based monomer | (A-2) | | — | — | — | — |
| (parts by weight) | (A-3) | | 3.3 | — | 3.3 | — |
| First volatilization tank | | | o | o | o | o |
| Second volatilization tank | | | o | o | x | x |
| Content of maleimide-based monomer unit in graft copolymer | | | 4.8 | — | 4.9 | — |
| Glass transition temperature | | | 115.1 | 110.2 | 115.3 | 110.1 |
| VST | | | 106.4 | 100.5 | 106.9 | 100.4 |
| Residual monomer | | | 481 | 431 | 777 | 758 |
| TVOC | | | 36.78 | 33.1 | 53.98 | 72.9 |
| b | | | 3.5 | −1.58 | 1.3 | −2.27 |

Referring to Table 1 and Table 2, in the case of Example 1 to Example 5, it can be seen that the relative amount of an N-phenylmaleimide unit included in the graft copolymer with respect to the amount of N-phenylmaleimide added in the polymerization is large.

When each of Example 1 and Comparative Example 3 and Example 2 and Comparative Example 1 is compared with each other, the amounts of the N-phenylmaleimide unit in the graft copolymers are the same, but the amount of N-phenylmaleimide added in the preparation of a graft copolymer was larger in Comparative Example 3 than in Example 1, and in Comparative Example 1 than in Example 2. From this result, it can be predicted that, when liquid N-phenylmaleimide is added instead of solid-phase N-phenylmaleimide, the polymerization conversion rate of N-phenylmaleimide will be improved.

Meanwhile, when Example 1 and Example 2 are compared, Example 2, in which N-phenylmaleimide obtained by melting at a relatively higher temperature is added, exhibits a lower glass transition temperature, a lower VST, and a higher "b" value of an injection-molded specimen than those of Example 1. From this result, it can be seen that, when N-phenylmaleimide is melted at an appropriate temperature, a polymerization conversion rate, a glass transition temperature, the VST, and a "b" value are improved.

When each of Example 1 and Example 5, Comparative Example 1 and Comparative Example 3, and Comparative Example 2 and Comparative Example 4 is compared with each other, Example 1, which passes through two volatilization tanks, exhibits remarkably reduced unreacted monomers and remarkably reduced TVOC. However, in the case of Example 1, Comparative Example 1, and Comparative Example 2, "b" values are degraded because the graft copolymer is exposed to high temperature for a longer time while passing through two volatilization tanks.

The invention claimed is:

1. A method of preparing a graft copolymer, comprising:
preparing a liquid maleimide-based monomer;
preparing a reaction solution including a diene-based rubber polymer, an aromatic vinyl-based monomer, and a vinyl cyan-based monomer; and
adding the liquid maleimide-based monomer and the reaction solution to a reactor and carrying out polymerization,
wherein the liquid maleimide-based monomer is prepared by melting a solid-phase maleimide-based monomer.

2. The method of claim 1, wherein the melting is carried out at a temperature 5 to 40° C. higher than the melting point of the maleimide-based monomer.

3. The method of claim 1, wherein the melting is carried out at a temperature 10 to 25° C. higher than a melting point of the maleimide-based monomer.

4. The method of claim 1, wherein the maleimide-based monomer is one or more selected from the group consisting of maleimide, N-methylmaleimide, N-cyclohexylmaleimide, N-phenylmaleimide, N-(4-chlorophenyl)maleimide, 2-methyl-N-phenylmaleimide, and N-(p-methoxyphenyl)maleimide.

5. The method of claim 1, wherein the polymerization is bulk polymerization.

6. The method of claim 1, further comprising, after the polymerization, removing unreacted monomers and a solvent from a copolymer.

7. The method of claim 6, wherein the removal of unreacted monomers and a solvent from a copolymer includes:
primarily removing unreacted monomers and a solvent from a copolymer at a first temperature and a first pressure; and
secondarily removing unreacted monomers and solvent from the copolymer, from which unreacted monomers and a solvent have been primarily removed, at a second temperature and a second pressure,
wherein the first temperature is lower than the second temperature and the first pressure is higher than the second pressure.

8. The method of claim 7, wherein the first temperature ranges from 140 to 180° C. and the first pressure ranges from 400 to 600 Torr.

9. The method of claim 7, wherein the second temperature ranges from 210 to 250° C. and the second pressure is 20 Torr or less.

* * * * *